(12) United States Patent
Noh et al.

(10) Patent No.: US 7,767,326 B2
(45) Date of Patent: Aug. 3, 2010

(54) WATER CONTROLLER SYSTEM HAVING STABLE STRUCTURE FOR DIRECT METHANOL FUEL CELL

(75) Inventors: Taegeun Noh, Seoul (KR); Goyoung Moon, Seoul (KR)

(73) Assignee: LG Chem, Ltd. (KR)

(*) Notice: Subject to any disclaimer, the term of this patent is extended or adjusted under 35 U.S.C. 154(b) by 982 days.

(21) Appl. No.: 11/534,858

(22) Filed: Sep. 25, 2006

(65) Prior Publication Data
US 2007/0224465 A1 Sep. 27, 2007

(30) Foreign Application Priority Data
Nov. 1, 2005 (KR) ................ 10-2005-0103579

(51) Int. Cl.
*H01M 8/00* (2006.01)
*F01N 3/08* (2006.01)
(52) U.S. Cl. .................... 429/13; 422/176
(58) Field of Classification Search ............. 429/34; 220/565
See application file for complete search history.

(56) References Cited

U.S. PATENT DOCUMENTS 7,432,003 B2 * 10/2008 Miyazaki et al. ............ 429/17

2004/0115606 A1 6/2004 Davies

FOREIGN PATENT DOCUMENTS

| JP | 2003-163021 | 6/2003 |
|----|-------------|--------|
| JP | 2004-186151 | 7/2004 |
| KR | 10-2004-0045312 | 6/2004 |

* cited by examiner

*Primary Examiner*—Patrick Ryan
*Assistant Examiner*—Karie O'Neill Apicella
(74) *Attorney, Agent, or Firm*—Cantor Colburn LLP

(57) ABSTRACT

Disclosed herein is a water controller system constructed such that water generated from a cathode of a direct methanol fuel cell system and carbon dioxide and an unreacted methanol solution generated from an anode of the direct methanol fuel cell system are introduced into the water controller system, the carbon dioxide is discharged out of the water controller system, and the methanol solution is circulated to the corresponding electrode so as to reuse the methanol solution. The water controller system includes a specific-structure floating member having a gas exhaust port, a gas/solution inlet port, and an outlet port. The water controller system further includes a flexible inlet pipe, a flexible outlet pipe, and a flexible exhaust pipe, which are connected to the floating member. The water controller system for fuel cells has the effects of reusing an unreacted methanol solution discharged from the fuel cell, being normally operated even when the water controller system is inclined, and uniformly maintaining the amount of water and methanol in the water controller system.

17 Claims, 4 Drawing Sheets

WATER CONTROLLER SYSTEM HAVING STABLE STRUCTURE FOR DIRECT METHANOL FUEL CELL

FIELD OF THE INVENTION

The present invention relates to a water controller system constructed such that water generated from a cathode of a direct methanol fuel cell system and carbon dioxide and an unreacted methanol solution generated from an anode of the direct methanol fuel cell system are introduced into the water controller system, the carbon dioxide is discharged out of the water controller system, and the methanol solution is circulated to the corresponding electrode so as to reuse the methanol solution, and, more particularly, to a water controller system comprising a seal-type case having a predetermined amount of water contained therein, a hollow-structure floating member having a methanol solution (methanol and water) partially contained therein, a gas exhaust port mounted at the upper part of the water controller system for discharging the carbon dioxide, a gas/solution inlet port mounted at the lower part of the water controller system for allowing the water, the carbon dioxide, and the unreacted methanol solution to be introduced into the water controller system from the cathode and the anode therethrough, and an outlet port mounted at the lower part of the water controller system for supplying the methanol solution to the anode, wherein a flexible inlet pipe, which extends from the inlet port, and a flexible outlet pipe, which extends from the outlet port, are connected to the lower end of the floating member, which floats in the seal-type case, and a flexible exhaust pipe, which extends from the exhaust port, is connected to the upper end of the floating member, and a fuel cell system including the water controller system.

BACKGROUND OF THE INVENTION

A fuel cell is a novel electric power production system that directly converts chemical energy generated by the electrochemical reaction between fuel (hydrogen or methanol) and an oxidizing agent (oxygen or air) into electrical energy. The fuel cell has attracted considerable attention as a next-generation energy source by virtue of the high energy efficiency and the low contaminant discharge, i.e., the environmentally friendly characteristics, and much research on the fuel cell has been carried out.

Based on the kinds of electrolytes used, fuel cells are classified into a phosphoric acid fuel cell, an alkaline fuel cell, a polymer electrolyte fuel cell, a molten carbonate fuel cell, and a solid oxide fuel cell. Among them, the proton exchange membrane fuel cell is classified as a proton exchange membrane fuel cell using hydrogen gas as fuel or a direct methanol fuel cell in which liquid-phase methanol, as direct fuel, is supplied to an anode.

The polymer electrolyte fuel cell is in the spotlight as a portable power supply unit, a power supply unit for vehicles, or a power supply unit for home use by virtue of low operating temperature of 100° C. or less, elimination of leakage problems due to the use of a solid electrolyte, rapid starting and response characteristics, and excellent durability. Especially, the direct methanol fuel cell has a simple fuel supply system, and the overall structure of the direct methanol fuel cell is not complicated as compared to other fuel cells. Furthermore, the miniaturization of the direct methanol fuel cell is possible. Consequently, research on the direct methanol fuel cell as a portable fuel cell is in progress.

FIG. 1 is a typical view illustrating a general direct methanol fuel cell system.

Referring to FIG. 1, the fuel cell system 100 comprises: a fuel cell having a cathode 112 and an anode 114 disposed at opposite sides of an electrolyte membrane 116 made of a polymer material; a first pump 140 for supplying air, including oxygen, as fuel, to the cathode 112; a second pump 150 for supplying a methanol solution, as fuel, to the anode 114; a water controller system 200 constructed such that water, carbon dioxide, and unreacted methanol generated from the fuel cell 110 are introduced into the water controller system 200 through pipes 160 and 170, the carbon dioxide is discharged out of the water controller system 200 through an outlet pipe 190, and the water and the unreacted methanol are supplied again to the fuel cell 110 by the second pump 150; a third pump 180 for supplying the wasted methanol to the water controller system 200; a heat exchanger; and a methanol tank (Pure MeOH).

The methanol solution supplied to the anode 114 is separated into hydrogen ions and electrons. The hydrogen ions move to the cathode 112 through the electrolyte membrane 116, and the electrons moves to the cathode 112 via an external circuit (not shown, whereby electric power is produced from the fuel cell 110. At this time, water is generated from the cathode 112, and carbon dioxide and unreacted methanol are generated from the anode 114. The water, the carbon dioxide, and the unreacted methanol are introduced into the water controller system 200. Among them, the water and the unreacted methanol are mixed with pure methanol, which is supplied from the outside so as to supplement the amount of methanol consumed, and the mixture is supplied again to the fuel cell.

As described above, the direct methanol fuel cell system is normally operated only when a methanol solution is continuously supplied to the direct methanol fuel cell system, and carbon dioxide is continuously removed, which is unlike chemical cells. For this reason, the function of the water controller system, which continuously supplies the methanol solution to the direct methanol fuel cell system, and continuously removes the carbon dioxide, is very important.

Generally, a carbon dioxide discharge position, from which the carbon dioxide, which is gas, is discharged, and a methanol solution discharge position, from which the methanol solution, which is liquid, is discharged, are fixed in the water controller system. As a result, when the water controller system is inclined or shaken, the above-mentioned materials may not be discharged from the corresponding discharge positions.

In order to solve the above-described problems, there has been proposed a method of disposing a liquid separating membrane and an absorbing member for absorbing a methanol solution in the water controller system, thereby reusing the methanol solution absorbed into the absorbing member, which is disclosed in U.S. Unexamined Patent Publication No. 2004-115606, Japanese Unexamined Patent Publication No. 2004-186151, and Korean Unexamined Patent Publication No. 2004-45312. However, the above conventional method has problems in that, when the absorbing member is completely wetted by the methanol solution, the methanol is not absorbed into the absorbing member any more, the carbon dioxide flows in the water controller system, and high pump pressure is needed to resupply the absorbed methanol solution.

On the other hand, Japanese Unexamined Patent Publication No. 2003-163021 discloses a structure constructed such that discharge and supply are accomplished by using a float pipe even when the water controller system is inclined. In this conventional structure, however, an additional unit, which is separated from the water controller system, must be provided, whereby the total size of the fuel cell system is increased.

SUMMARY OF THE INVENTION

Therefore, the present invention has been made to solve the above-mentioned problems, and other technical problems that have yet to be resolved.

Specifically, it is an object of the present invention to provide a water controller system that is capable of effectively reusing an unreacted methanol solution discharged from a fuel cell, being normally operated even when the water controller system is inclined, and uniformly maintaining the amount of water and methanol in the water controller system.

It is another object of the present invention to provide a fuel cell system including the water controller system, the fuel cell system being constructed in a small-sized structure.

In accordance with one aspect of the present invention, the above and other objects can be accomplished by the provision of a water controller system constructed such that water generated from a cathode of a direct methanol fuel cell system and carbon dioxide and an unreacted methanol solution generated from an anode of the direct methanol fuel cell system are introduced into the water controller system, the carbon dioxide is discharged out of the water controller system, and the methanol solution is circulated to the corresponding electrode so as to reuse the methanol solution, wherein the water controller system comprises: a seal-type case having a predetermined amount of water contained therein; a hollow-structure floating member having a methanol solution (methanol and water) partially contained therein; a gas exhaust port mounted at the upper part of the water controller system for discharging the carbon dioxide; a gas/solution inlet port mounted at the lower part of the water controller system for allowing the water, the carbon dioxide, and the unreacted methanol solution to be introduced into the water controller system from the cathode and the anode therethrough; and an outlet port mounted at the lower part of the water controller system for supplying the methanol solution to the anode, and wherein a flexible inlet pipe, which extends from the inlet port, and a flexible outlet pipe, which extends from the outlet port, are connected to the lower end of the floating member, which floats in the seal-type case, and a flexible exhaust pipe, which extends from the exhaust port, is connected to the upper end of the floating member.

Consequently, the water controller system according to the present invention is normally operated, owing to the above-described structural characteristics, even when the water controller system cannot be maintained upright due to various external causes.

In the present invention, the "methanol solution" means a mixture of pure methanol supplied from the outside, unreacted methanol introduced from the fuel cell, and water, which are supplied from the water controller system to the fuel cell.

According to the present invention, it is preferable that ½ to ¾ of the internal volume of the seal-type case be filled with the water while the floating member, in which the methanol solution is contained, floats in the seal-type case, and it is preferable that ½ to ¾ of the internal volume of the floating member be filled with the methanol solution. In this case, the floating member floats in the seal-type case such that approximately ½ to ¾ of the floating member is submerged in the water while the outer surface of the floating member is spaced apart from the inner surface of the seal-type case.

More preferably, the gas exhaust port is mounted at the uppermost end of the water controller system, and the gas/solution inlet port and the outlet port are mounted at the lowermost end of the water controller system.

In order that the floating member is maintained upright in the water controller system according to the present invention, the lower part of the floating member must be heavier that the upper part of the floating member when the floating member is divided into the upper and lower parts about the horizontal line passing though the exact center of the floating member. In the above-described structure, the gas/solution inlet port and the outlet port are mounted at the lower end of the floating member, and the flexible inlet pipe and the flexible outlet pipe are connected to the gas/solution inlet port and the outlet port, respectively. Consequently, the lower part of the floating member is heavier that the upper part of the floating member. In order to increase the difference of weight between the upper and lower parts of the floating member, methods of manufacturing the lower part of the floating member with a material having relatively high specific gravity or increasing the thickness of the hollow structure may be considered.

In a preferred embodiment, the water controller system may further comprise: a balance weight mounted at the lower end of the floating member, to which the inlet pipe and the outlet pipe are connected, the balance weight being relatively heavy, whereby the connection regions between the floating member and the inlet pipe and between the floating member and the outlet pipe are located at the lowermost end of the floating member, and the connection region between the floating member and the exhaust pipe is located at the uppermost end of the floating member, even when the water controller system is inclined or rotated while the floating member floats in the seal-type case.

In a preferred embodiment, the water controller system may further comprise: one or more semipermeable membrane members mounted at the outer surface of the floating member, which are in contact with the water while the floating member floats in the seal-type case, for performing an osmotic action. The semipermeable membrane members interrupt the movement of the methanol and allow the movement of the water to uniformly maintain the concentration of the methanol solution in the floating member and to uniformly maintain the amount of the water in the seal-type case. Consequently, it is possible to easily control the concentration of the methanol to a desired level even without the provision of an additional methanol concentration detection unit and an additional methanol concentration control unit.

The seal-type case may be constructed in various structures. Preferably, the seal-type case is constructed in a hexahedral structure in consideration of the installation space and the stable fixing of the seal-type case in the fuel cell system.

On the other hand, it is preferable that the floating member be constructed in a spherical structure, by which any forcible change of orientation of the floating member due to the friction between the floating member and the inner surface of the hexahedral case, not due to the floating phenomenon, is minimized when the floating member is moved due to various causes.

In accordance with another aspect of the present invention, there is provided a fuel cell system including the above-described water controller system. The construction of the fuel cell system using the water controller system according to the present invention is well known from the art to which the present invention pertains, as shown in FIG. 1, and therefore, the description of the fuel cell system will not be given.

BRIEF DESCRIPTION OF THE DRAWINGS

The above and other objects, features and other advantages of the present invention will be more clearly understood from the following detailed description taken in conjunction with the accompanying drawings, in which.

Figure 1:
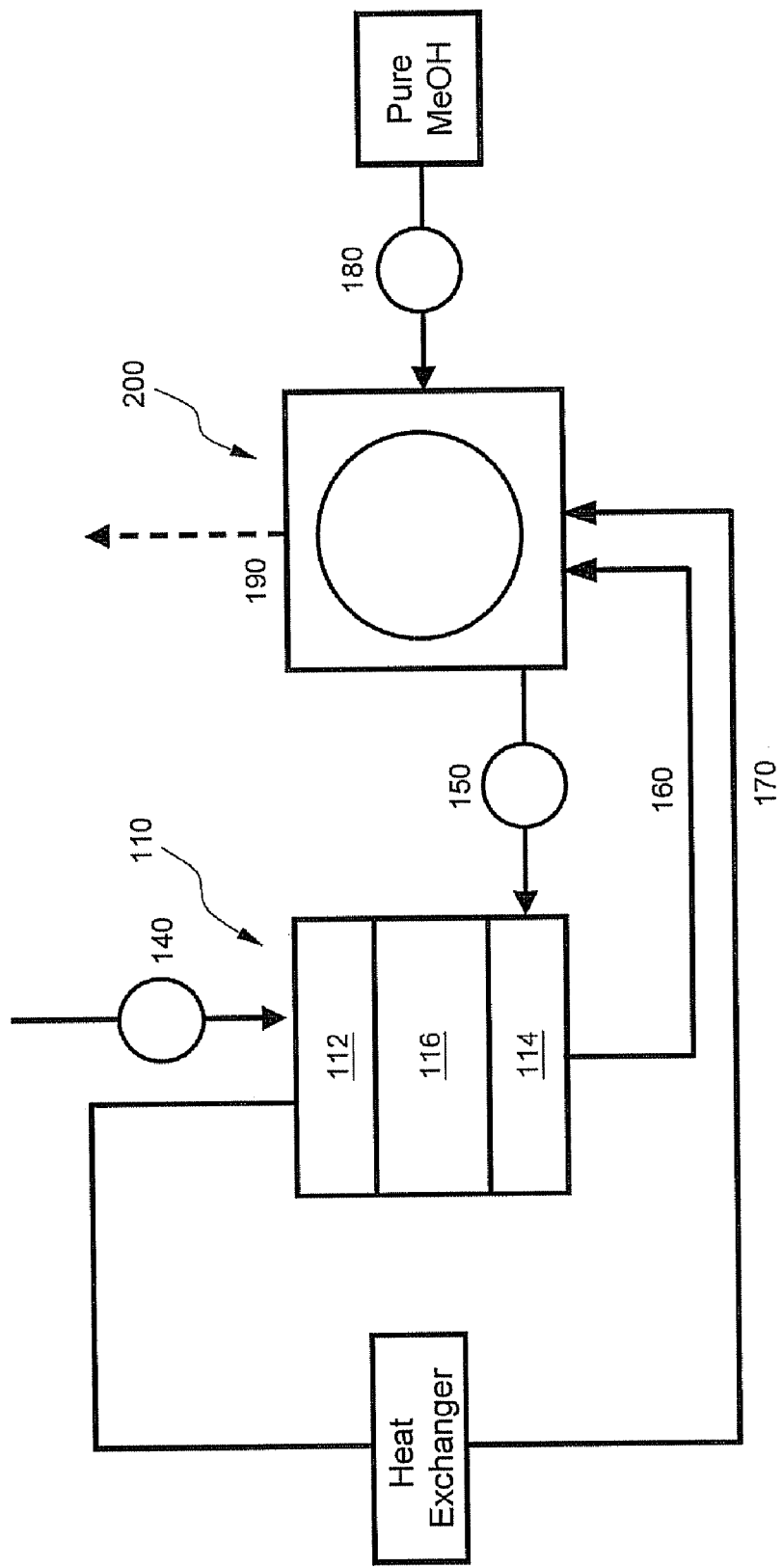
FIG. 1 is a typical view illustrating a general direct methanol fuel cell system.

<Description of Main Reference Numerals of the Drawings>

100: fuel cell system
200: water controller system
210: seal-type case
220: floating member

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 2:
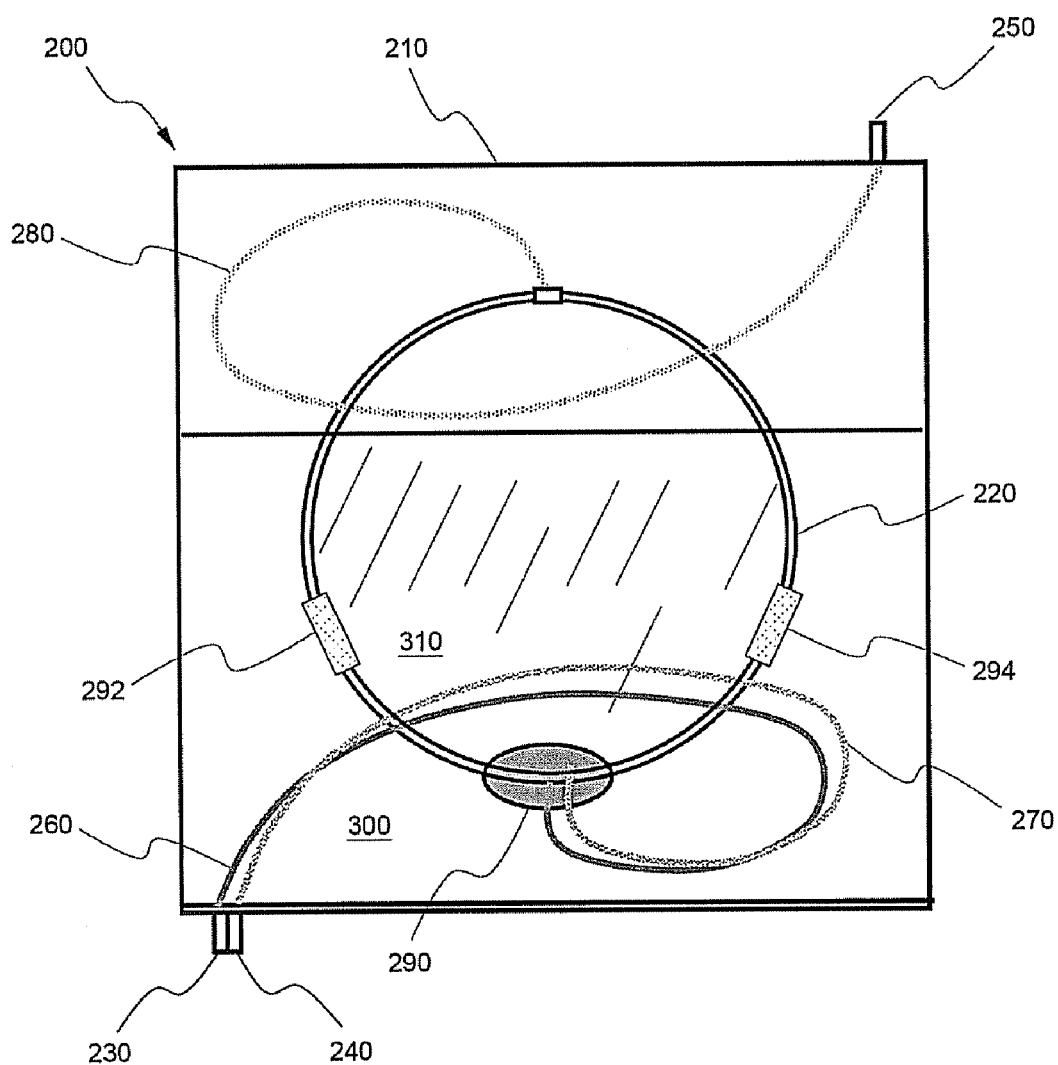
FIG. 2 is a typical view illustrating a water controller system according to a preferred embodiment of the present invention.

FIG. 2 is a typical view illustrating a water controller system according to a preferred embodiment of the present invention.

Referring to FIG. 2, the water controller system includes a seal-type case 210, in which water 300 is partially contained, and a floating member 220, which is partially submerged in the water 300 and partially floats on the water 300, the floating member 220 having a methanol solution 310 contained therein.

The seal-type case 210 is constructed generally in a hexahedral structure. The seal-type case 210 is provided at the left lower end thereof with an inlet port 230, through which water generated from a cathode (not shown) of a fuel cell and carbon dioxide and unreacted methanol generated from an anode (not shown) of the fuel cell are introduced into the seal-type case 210, and an outlet port 240, through which the methanol solution is supplied to the fuel cell. The inlet port 230 and the outlet port 240 are disposed adjacent to each other. The seal-type case 210 is provided at the right upper end thereof with an exhaust port 250, through which the carbon dioxide is discharged out of the seal-type case 210.

The floating member 220 is constructed in a spherical structure. To the lower end of the floating member 220 are connected a flexible inlet pipe 260, which extends from the inlet port 230, and a flexible outlet pipe 250, which extends from the outlet port 240. To the upper end of the floating member 220 is connected a flexible exhaust pipe 280, which extends from the exhaust port 250. In the inlet port 230 or in the inlet pipe 260 may be mounted a one-direction opening and closing member for preventing a backward flow. The one-direction opening and closing member may be mounted in the outlet port 240 or in the outlet pipe 250. According to circumstances, an additional member for preventing such a backward flow may be mounted in the fuel cell (not shown) in which the introduction and the discharge are eventually carried out.

At the lower end of the floating member 220, to which the inlet pipe 260 and the outlet pipe 270 are connected, is mounted a balance weight 290, which is relatively heavy, whereby the connection regions between the floating member 220 and the inlet pipe 260 and between the floating member 220 and the outlet pipe 270 are located at the lowermost end of the floating member 220, and the connection region between the floating member 220 and the exhaust pipe 280 is located at the uppermost end of the floating member 220, even when the water controller system is inclined or shaken while the floating member 220 floats.

Consequently, even when the water controller system 200 is inclined or shaken, the carbon dioxide moving to upper part of the floating member 220, which is in a gas state, and the methanol solution collected in the lower part of the floating member 220, which is in a liquid state, are located separately toward the corresponding discharge regions in the floating member 220.

At opposite-side lower parts of the outer surface of the floating member 220, which are in contact with the water while the balance weight 290 is disposed between the opposite-side lower parts of the floating member 220, are mounted semipermeable membrane members 292 and 294, which perform an osmotic action, respectively. The semipermeable membrane members 292 and 294 interrupt the movement of the methanol and allow the movement of the water to maintain the concentration of the methanol solution in the floating member 220 and to maintain the amount of the water in the seal-type case 210 at a predetermined level.

Figure 3:
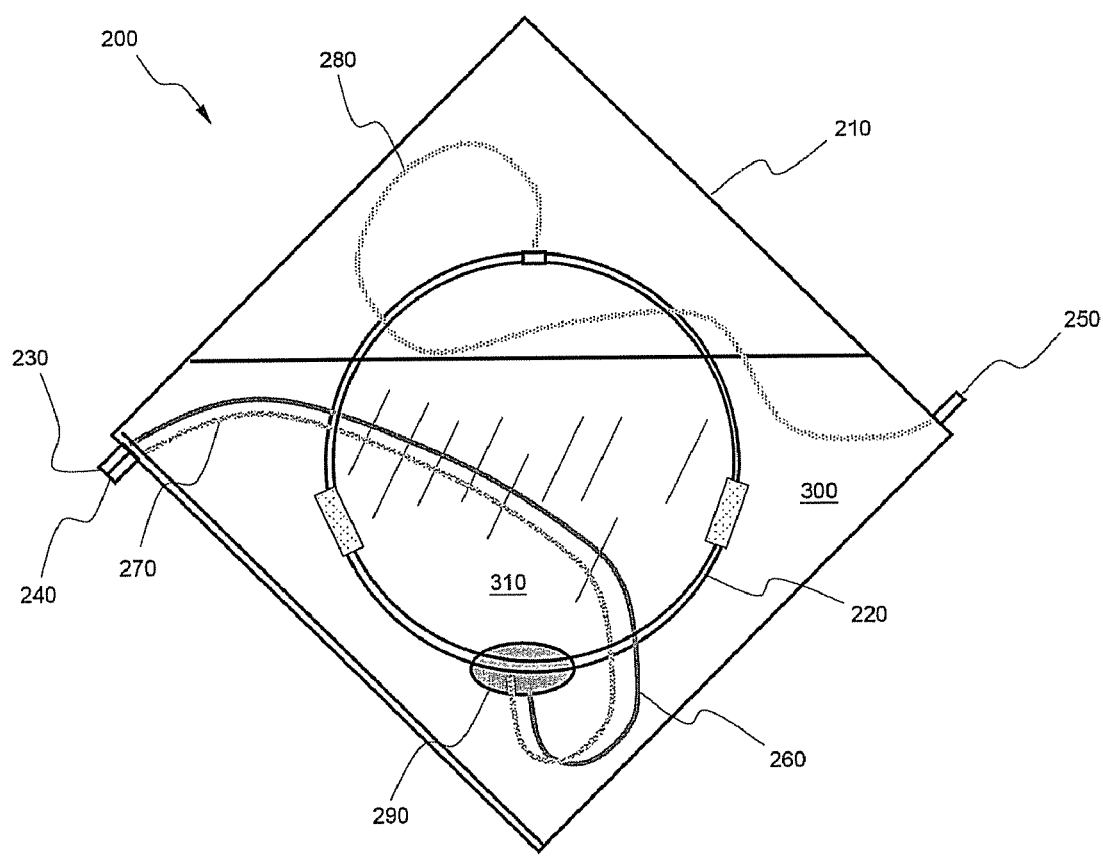
FIG. 3 is a typical view illustrating a 45 degree inclination of the water controller system shown in FIG. 2.

FIG. 3 is a typical view illustrating a 45 degree inclination of the water controller system shown in FIG. 2.

Referring to FIG. 3, even when the water controller system 200 is inclined by 45 degrees, the floating member 220 is maintained upright due to the balance weight 290 although the seal-type case 210 is inclined accordingly.

Furthermore, even when the uppermost exhaust port 250 of the seal-type case 210 is not located at the uppermost position any longer, but is submerged in the water, the carbon dioxide is present in the upper part of the floating member 220, and is connected to the exhaust port 250. Consequently, the carbon dioxide can be easily discharged out of the seal-type case 210 through the flexible exhaust pipe 280. Also, even when the lowermost inlet port 230 and the lowermost outlet port 240 of the seal-type case 210 are not located at the lowermost positions any longer, the water and the unreacted methanol are collected in the lower part of the floating member 220, and are connected to the inlet port 230 and the outlet port 240. Consequently, the water and the unreacted methanol can be supplied to the fuel cell through the flexible inlet pipe 260 and the flexible outlet pipe 270.

Figure 4:
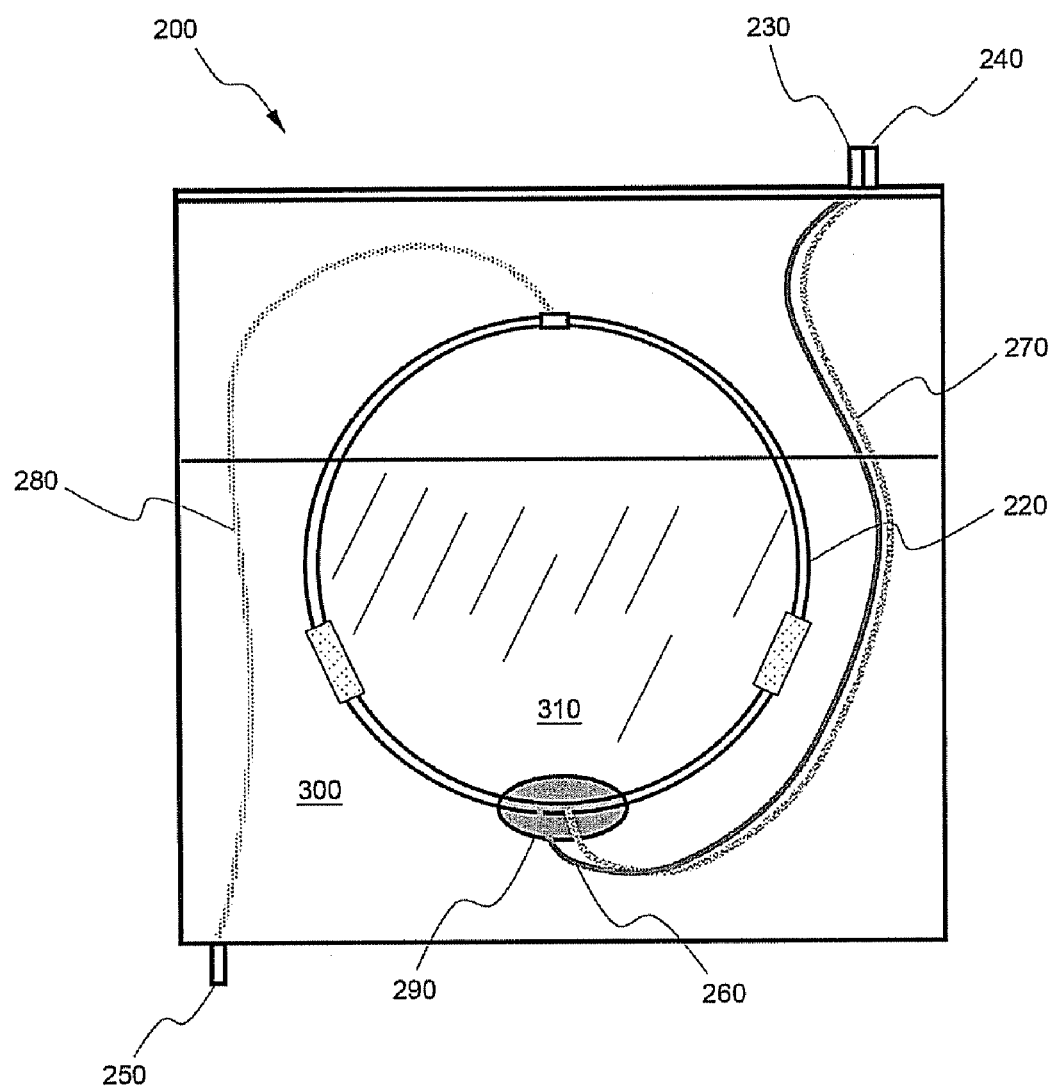
FIG. 4 is a typical view illustrating a 180 degree inclination of the water controller system shown in FIG. 2.

FIG. 4 is a typical view illustrating a 180 degree inclination of the water controller system shown in FIG. 2.

Referring to FIG. 4, even when the inlet port 230 and the outlet port 240 are located at the uppermost positions while the exhaust port 250 is located at the lowermost position, the positions of the carbon dioxide and the methanol solution in the floating member 220 are not changed, and the carbon dioxide and the methanol solution are present at the regions where the exhaust pipe 280, the inlet pipe 260, and the outlet pipe 270 are located, according to the same principle as the 45 degree inclination of the water controller system 200. Consequently, the water controller system 200 is normally operated.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the water controller system for fuel cells according to the present invention has the effects of reusing an unreacted methanol solution discharged from the fuel cell, being normally operated even when the water controller system is inclined, and uniformly maintaining the amount of water and methanol in the water controller system.

What is claimed is:

1. A water controller system constructed such that water generated from a cathode of a direct methanol fuel cell system and carbon dioxide and an unreacted methanol solution generated from an anode of the direct methanol fuel cell system are introduced into the water controller system, the carbon dioxide is discharged out of the water controller system, and the methanol solution is circulated to the corresponding electrode so as to reuse the methanol solution, wherein the water controller system comprises:

a seal-type case having a predetermined amount of water contained therein;

a hollow-structure floating member having a methanol solution partially contained therein;

a gas exhaust port mounted at the upper part of the water controller system for discharging the carbon dioxide;

a gas/solution inlet port mounted at the lower part of the water controller system for allowing the water, the carbon dioxide, and the unreacted methanol solution to be introduced into the water controller system from the cathode and the anode therethrough; and an outlet port mounted at the lower part of the water controller system for supplying the methanol solution to the anode, and wherein a flexible inlet pipe, which extends from the inlet port, and a flexible outlet pipe, which extends from the outlet port, are connected to the lower end of the floating member, which floats in the seal-type case, and a flexible exhaust pipe, which extends from the exhaust port, is connected to the upper end of the floating member.

2. The water controller system according to claim 1, wherein ½ to ¾ of the internal volume of the seal-type case is filled with the water while the floating member floats in the seal-type case.

3. The water controller system according to claim 1, wherein ½ to ¾ of the internal volume of the floating member is filled with the methanol solution.

4. The water controller system according to claim 2, wherein the interior of the seal-type case and the interior of the floating member are filled with the water and the methanol solution, respectively, at a level that the outer surface of the floating member is spaced apart from the inner surface of the seal-type case while the floating member floats in the seal-type case.

5. The water controller system according to claim 1, wherein the gas exhaust port is mounted at the uppermost end of the water controller system, and the gas/solution inlet port and the outlet port are mounted at the lowermost end of the water controller system.

6. The water controller system according to claim 1, further comprising:

a balance weight mounted at the lower end of the floating member, to which the inlet pipe and the outlet pipe are connected, the balance weight being relatively heavy, whereby the connection regions between the floating member and the inlet pipe and between the floating member and the outlet pipe are located at the lowermost end of the floating member while the floating member floats in the seal-type case.

7. The water controller system according to claim 1, further comprising:

one or more semipermeable membrane members mounted at the outer surface of the floating member, which are in contact with the water while the floating member floats in the seal-type case, for performing an osmotic action such that the movement of the methanol is interrupted, but the movement of the water is allowed.

8. The water controller system according to claim 1, wherein the seal-type case is constructed generally in a hexahedral structure, and the floating member is constructed in a spherical structure.

9. A fuel cell system including the water controller system according to claims 1.

10. The water controller system according to claim 3, wherein the interior of the seal-type case and the interior of the floating member are filled with the water and the methanol solution, respectively, at a level that the outer surface of the floating member is spaced apart from the inner surface of the seal-type case while the floating member floats in the seal-type case.

11. A fuel cell system including the water controller system according to claim 2.

12. A fuel cell system including the water controller system according to claim 3.

13. A fuel cell system including the water controller system according to claim 4.

14. A fuel cell system including the water controller system according to claim 5.

15. A fuel cell system including the water controller system according to claim 6.

16. A fuel cell system including the water controller system according to claim 7.

17. A fuel cell system including the water controller system according to claim 8.

* * * * *